United States Patent [19]

Federmann et al.

[11] 4,358,284

[45] Nov. 9, 1982

[54] FIBER-REINFORCED DRIVESHAFT

[75] Inventors: Helmut Federmann, Bergisch Gladbach; Joachim Bausch, Dürscheid, both of Fed. Rep. of Germany

[73] Assignee: Felten & Guilleaume Carlswerk AG, Cologne, Fed. Rep. of Germany

[21] Appl. No.: 203,670

[22] Filed: Nov. 3, 1980

[30] Foreign Application Priority Data

Dec. 21, 1979 [DE] Fed. Rep. of Germany ....... 2951629

[51] Int. Cl.³ .......................... F16C 3/00; F16D 3/16
[52] U.S. Cl. .................................. 464/181; 138/109; 464/112; 464/183
[58] Field of Search ............... 64/1 R, 1 C, 1 S, 1 V, 64/3, 4, 17 R, 18, 21; 138/109

[56] References Cited
U.S. PATENT DOCUMENTS

| | | | |
|---|---|---|---|
| 1,594,579 | 8/1926 | Timbs et al. | 64/1 C |
| 3,067,593 | 12/1962 | McCool | 64/1 R |
| 4,131,701 | 12/1978 | Van Auken | 64/1 S X |
| 4,218,895 | 8/1980 | Smith et al. | 64/1 S |
| 4,236,386 | 12/1980 | Yates et al. | 64/1 S |
| 4,238,539 | 12/1980 | Yates et al. | 64/1 S X |
| 4,279,275 | 7/1981 | Stanwood et al. | 138/109 |

*Primary Examiner*—John Petrakes
*Attorney, Agent, or Firm*—Michael J. Striker

[57] ABSTRACT

A drive shaft, particularly for motor vehicles, has metallic end members having facing axially inner sections of larger diameter, axially outer sections of smaller diameters and transition sections connecting the inner and outer sections. The end members are, with the exception of small axial lengths of the outer sections, embedded in and surrounded by a tubular shaft member which is constructed by winding a plurality of layers of carbon or glass-fiber roving impregnated with synthetic plastic, onto a lost mandrel and heat-hardening the synthetic plastic.

17 Claims, 2 Drawing Figures

FIBER-REINFORCED DRIVESHAFT

BACKGROUND OF THE INVENTION

The present invention relates to a fiber-reinforced driveshaft particularly, but not exclusively, for transmitting power in a motor vehicle from the motor to the differential gear unit.

More particularly, the invention relates to an improved fiber-reinforced driveshaft of synthetic plastic material.

A driveshaft of this general type is already known from German published application DT-OS No. 2,851,293. It has a tubular part of glass-fiber reinforced synthetic plastic material in the axially spaced ends of which respective metallic rings are secured. Each ring has an outer circumferential surface which projects partially beyond the end of the tubular part and to which the yoke of a cardan joint—or else an intermediate motion-transmitting member—is welded.

The fiber-reinforced plastic material is wound about the rings in uncured condition and is then hardened. This produced primarily a friction connection between the rings and the tubular part, although the rings may also be provided with projections for better connection with the tubular part.

Prior-art driveshafts of this type are serviceable. However, over a period of time the unavoidable alternating load conditions and vibrations acting on such driveshafts cause the connection between the rings and the tubular part to become loosened, and the service life of such shafts is therefore relatively short. Also, the abrupt diameter reduction of the tubular part in the region of the inner ends of the rings is not conducive to a constant level of force transmission from one end of the shaft to the other; it reduces the force that can be transmitted and may, in extreme cases, even lead to cracking of the shaft at these locations.

SUMMARY OF THE INVENTION

It is an object of the invention to overcome the prior-art disadvantages.

A more particular object is to provide a fiber-reinforced driveshaft of synthetic plastic material which requires a relatively small expenditure of material and is light in weight, but which yet is capable of transmitting maximum force reliably and permanently.

A concomitant object of the invention is to provide a driveshaft of the type under discussion which can transmit forces—and has a service life—at least equal to those of a comparable steel driveshaft.

In keeping with the above objects, and with still others which will become apparent hereafter, one aspect of the invention resides in a pair of rotationally symmetrical hollow end members each having an axially inner cylindrical section and an axially outer cylindrical section which are connected by a transition section, the inner and outer sections of each end member having different diameters and the transition section having a wall thickness which increases in direction towards the outer section; and a tubular shaft member of synthetic plastic material connecting the end members and surrounding the inner section, transition section and all but an end portion of the outer section thereof in mating relationship, the shaft member being reinforced with a plurality of layers of synthetic plastic material-impregnated fiber roving.

The invention is based on the recognition that the frictional connection between the hollow tubular part of the drive shaft and its end members, due to the adhesion of the synthetic plastic material to the end members, does not suffice to produce the desired characteristics. Rather, a mechanical interengagement must also be present to the maximum extent, so that the tensile components resulting particularly from repetitive bending and other reasons, can be absorbed without damage. The invention is further based on the realization that optimum force (torque) transmission is assured by obtaining a constant flow of force—and that this can be assured by appropriate configuration and gradual merging of the end members into the cross-section of the tubular part. A driveshaft constructed according to the invention has increased strength, improved ability to withstand permanent loads and enhanced resistance to breakage. Furthermore, it is light in weight and can be produced very economically.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF PREFERRED EMBODIMENTS

Figure 1:
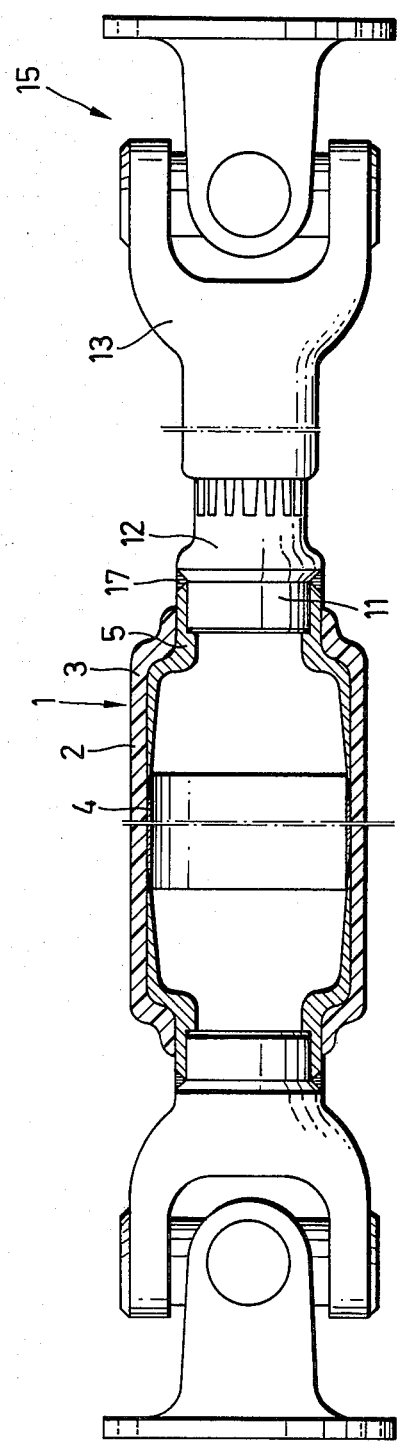
FIG. 1 is a longitudinal section through a driveshaft according to the invention.
Figure 2:
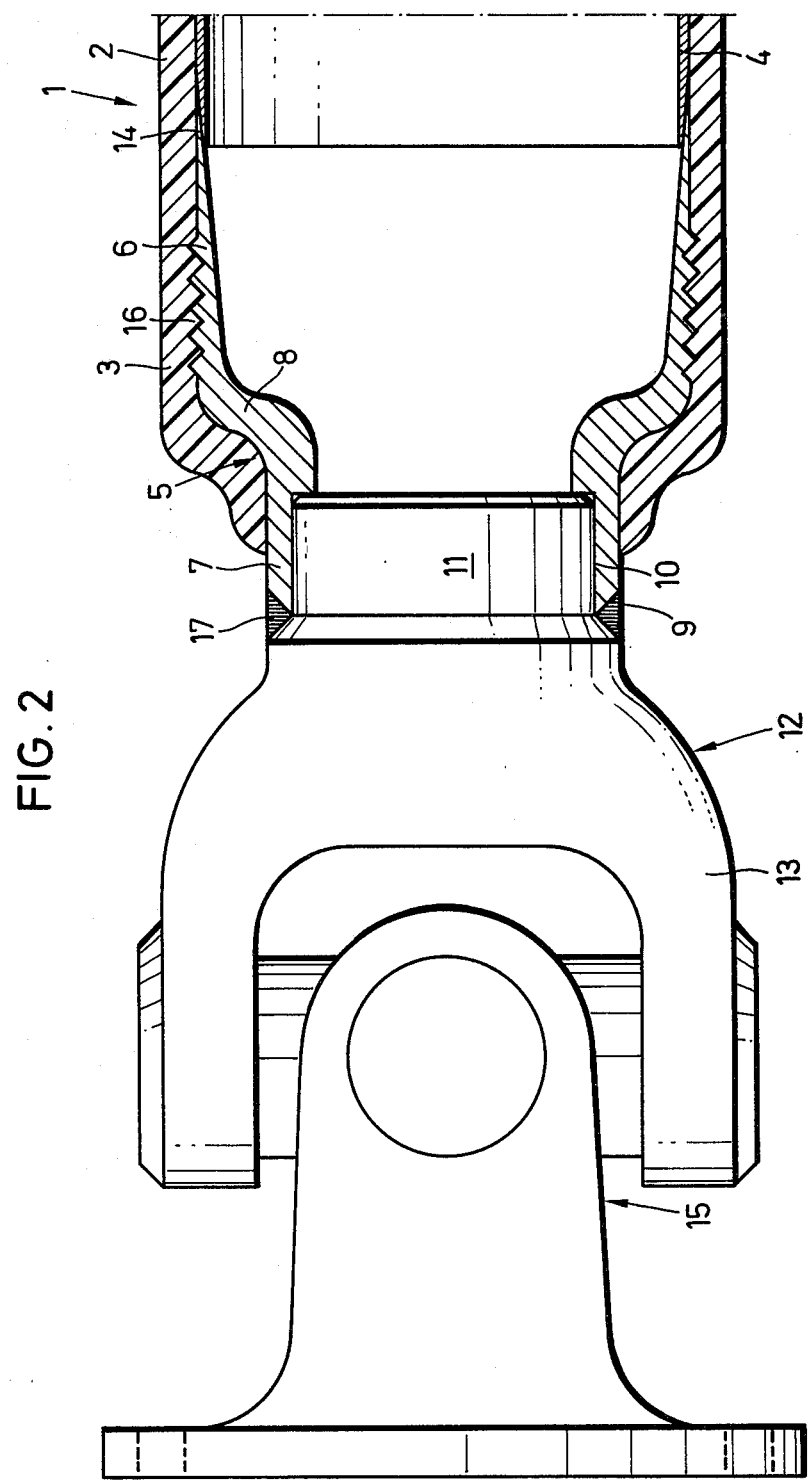
FIG. 2 is a longitudinal section, on an enlarged scale, showing one of the end members of the driveshaft in FIG. 1.

A driveshaft according to the invention is identified in toto with reference numeral 1 in FIGS. 1 and 2. It has a tubular main shaft part 2 (shown broken off in FIG. 1) of fiber-reinforced synthetic plastic material which tightly surrounds a permanently embedded core or mandrel 4 that may be hollow or of solid cross-section. Part 2 consists of several layers of high-strength fibers which are embedded in a matrix of thermally hardened synthetic plastic material, for example polyester, epoxy resins or vinyl esters. The fibers are wound or otherwise applied to the mandrel 4, already impregnated with the synthetic plastic material but of course before hardening of the same. It is especially advantageous if at least some of these layers are in form of glass or carbon-fiber rovings pre-impregnated with the plastic material (known as "prepregs") with the plastic being hardened by direct heat application during the winding operation. At least the inner and the outer layer should be of carbon-fiber prepregs. This results in simplified manufacture and takes into account the increased stress which acts upon the inner and outer layers due to the flow of force from one to the other of the end members 5 which are mounted in the opposite ends of the part 2, as well as the greater tensile and compressive stresses to which the inner and outer layers are subjected as a result of flexing of the shaft which cannot be entirely avoided even though the shaft is more resistant to such flexing than before.

The strength of the shaft can be further enhanced by winding adjacent layers of the plastic-impregnated glass or carbon-fiber rovings in such a manner that their convolutions cross each other, with the convolutions having a different pitch in each layer and with the innermost and the outermost layer being so wound that their convolutions have the minimum possible pitch. Such a construction assures uniform good adhesion of the inner layer to the mandrel 4 and in particular also to the end members 5; it further assures a smooth, highly abrasion-resistant surface for the outer layer.

Another advantageous feature is to embed between at least two adjacent ones of these fiber layers of the part 2, a fabric or roving of high-strength fibers (e.g. again glass or carbon fibers) which is also impregnated with the synthetic plastic material. This additional measure adds little to the cost and work of manufacturing the part 2, but results in a very definite improvement of the service life of the part. In the end regions 3 of the part 2 the layers are reinforced by additional windings which firmly surround a substantial portion of each of the end members 5.

The end members 5 are rotationally symmetrical tubular bodies of metallic material. Each of them has a cylindrically shaped section 6 within and a similar section 7 partly without the respective end of part 2. These sections 6, 7 are connected by a transition section 8 of rounded cross-sectional profile, the wall thickness of which increases in direction towards the outer section 7. Only an axial portion of the respective section 7 projects out of the part 2, just sufficient so that a connecting element 12—e.g. the yoke 13 of a universal point 15—can be welded or hard-soldered to the thus projecting portion of the respective section 7. Whether welding or hard-soldering is used depends upon the metal of the end members 5 and the elements 12, respectively; generally, steel or a light-metal alloy is preferred.

The sections 6 have an outer diameter corresponding exactly or substantially to the outer diameter of the hollow or solid cross-section mandrel 4. The wall thickness of each section increases gradually in direction towards the associated transition section 8. The outer diameter of each section 7 is smaller than that of the associated section 6 and each section 7 is provided with a concentric axial bore or recess 10 for the centering projection of the connecting element 12. As mentioned earlier, the element 12 may be the yoke 13 of a universal point, or a fluted stub shaft on which such a yoke part is suitably mounted or on which a connecting member—such as, e.g., a flange or the like—is mounted. Constructing and connecting at least one of the yoke parts 13 to be non-rotatable but axially slidable relative to the shaft 2, permits automatic accommodation of the arrangement to length variations in dependence upon varying operating conditions.

The proximal ends of the mandrel 4 and of the respective sections 6 are so constructed that each section 6 can be pushed to a limited extent onto the mandrel 4 prior to initiation of the fiber winding operation. Thus, the end members 5 are connected with the mandrel 4 to define therewith the overall length desired for the shaft 1, before the winding operation begins which forms the tubular part 2. After thermal hardening of the synthetic plastic material with which the fiber roving is impregnated, each of the end members will reliably remain in its predetermined position relative to mandrel 4 and form with the part 2a non-separable unit of predetermined length.

To facilitate the welding or solder connection between the sections 7 and the elements 12, the juxtaposed end faces of the section 7 and elements 12 are bevelled in mutually opposite directions. They thus together form a V-shaped circumferential groove in which an annular weld seam or solder seam can be formed. To improve the connection of the end members 5 with the part 2, especially to further assure that they cannot turn relative to the part 2, it is advantageous to provide at least the surface 16 of the section 6—but preferably also the section 7—with projections and/or depressions such as grooves, bumps, flutes, cross-cuts or the like, into which the material of part 2 can enter and wherein it can harden to provide a form-locking connection.

It is currently preferred for each of the sections 6 to taper conically (in cross-section) to a narrowed region at its innermost end, and for each end portion 14 of the mandrel 4 to be similarly conical so that the section 6 can be slipped over it to a certain extent (see FIG. 2). This provides for the connection of mandrel 4 with the end member 5 in the manner described before, during the winding operation, and assures a precisely predetermined overall length for the shaft 1.

Depending upon the operational requirements made of the shaft and/or taking into account the question of manufacturing economy, the mandrel 4 may be hollow and tubular and furnished in standard lengths. It may be of light metal (e.g. aluminum, magnesium alloy and the like), synthetic plastic material or a strong paper or cardboard. It may also be of solid cross-section and in this event might be made of synthetic plastic material, particularly one of the non-resilient synthetic plastic foam materials such as polyunethane or polystyrene. Such members can be readily and inexpensively made in large quantities, are of light weight and have sufficient mechanical strength for the purposes at hand.

While the invention has been illustrated and described as embodied in a drive shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A drive shaft, particularly for motor vehicles, comprising a pair of rotationally symmetrical hollow end members each having an axially inner cylindrical section and an axially outer cylindrical section which are connected by a transition section, the inner and outer section of each end member having different diameters and the transition section having a wall thickness which increases in direction towards the outer section; and a tubular shaft member of synthetic plastic material connecting said end members and surrounding said inner section, transition section and all but an end portion of the outer section thereof in mating relationship, said shaft member being reinforced with a plurality of layers of synthetic plastic material—impregnated fiber roving.

2. A drive shaft as defined in claim 1, said end members being of metallic material.

3. A drive shaft as defined in claim 1, said outer section having a diameter which is smaller than the diameter of said inner section.

4. A drive shaft as defined in claim 1; further comprising a mandrel permanently embedded in said shaft member intermediate said end members and upon which said layers of fiber roving are wound.

5. A drive shaft as defined in claim 4, said inner section having respective outer diameters which are at least substantially the same as the outer diameter of said mandrel.

6. A drive shaft as defined in claim 5, said inner sections each having a wall thickness which increases in direction towards the associated transition section, said outer sections each having an axial concentric recess adapted to receive a portion of an element to be connected to said shaft and said outer sections also each having an axial end face provided with a bevel so as to define with a similar bevel of a juxtaposed end face of an element to be connected on annular V-shaped groove in which the outer section may be joined by a seam with the element to be connected.

7. A drive shaft as defined in claim 6, said end members each having an outer circumferential surface which is provided at least in the region of the inner section with portions forming a relief for interengagement with the surrounding material of said shaft member.

8. A drive shaft as defined in claim 6, said inner section each conically tapering in its cross-section in direction towards an inner end of the inner section, and said mandrel having axially spaced ends which conically taper in cross-section oppositely to the respective inner section, so that each inner section can axially overlap one of said ends to a predetermined extent.

9. A drive shaft as defined in claim 4, said mandrel being tubular and of synthetic plastic material, light metal or hard paper.

10. A drive shaft as defined in claim 4, said mandrel being of solid cross-section and of synthetic plastic material.

11. A drive shaft as defined in claim 10, said synthetic plastic material of said mandrel being a non-resilient foam.

12. A drive shaft as defined in claim 11, said foam being polyurethane foam or polystyrene foam.

13. A drive shaft as defined in claim 4, at least the radially innermost and radially outermost of said layers being glass fiber or carbon-fiber prepregs the synthetic plastic material of which is hardened by heating during application to said mandrel.

14. A drive shaft as defined in claim 1, said fiber rovings being of glass fibers, carbon fibers or synthetic plastic fibers.

15. A drive shaft as defined in claim 14, said layers being in form of consecutively applied windings, adjacent ones of said windings crossing one another and said windings including an innermost winding and an outermost winding which are wound at minimum pitch.

16. A drive shaft as defined in claim 15; further comprising a plastic impregnated fiber roving located between at least two adjacent ones of said windings.

17. A drive shaft as defined in claim 16; said windings including additional windings applied on part of said shaft member at the end portions thereof which surround said end members.

* * * * *